United States Patent [19]
Casey et al.

[11] Patent Number: 5,140,650
[45] Date of Patent: Aug. 18, 1992

[54] COMPUTER-IMPLEMENTED METHOD FOR AUTOMATIC EXTRACTION OF DATA FROM PRINTED FORMS

[75] Inventors: Richard G. Casey, Morgan Hill; David R. Ferguson, Folsom, Calif.

[73] Assignee: International Business Machines Corporation, Armonk, N.Y.

[21] Appl. No.: 305,828

[22] Filed: Feb. 2, 1989

[51] Int. Cl.$^5$ .............................................. G06K 9/20
[52] U.S. Cl. ...................................... 382/61; 382/48; 382/9; 382/33
[58] Field of Search .................. 382/61, 48, 40, 46, 382/33, 956, 57, 14, 22, 25, 30; 358/101, 102; 364/518, 514, 513

[56] References Cited

U.S. PATENT DOCUMENTS

| | | | |
|---|---|---|---|
| 4,503,556 | 3/1985 | Scherl et al. | 382/48 |
| 4,533,959 | 8/1985 | Sakuri | 382/61 |
| 4,741,045 | 4/1988 | Denning | 382/9 |
| 4,748,678 | 5/1988 | Takeda et al. | 382/61 |
| 4,933,984 | 6/1990 | Nakano | 382/61 |

*Primary Examiner*—Michael Razavi
*Attorney, Agent, or Firm*—Baker, Maxham, Jester & Meador

[57] ABSTRACT

A machine-implemented method for extracting character data from printed forms of the type having generally straight lines and data regions separated by lines utilizes a processor coupled to an image scanning device and a data storage device. The method includes the steps of scanning a blank form so as to create a digital image of a first array of pixels, identifying the pixels in the array which form generally straight lines of connected line pixels, creating data masks in the array at locations separated by the identified lines, the data masks corresponding to the data regions in the printed form, scanning a filled-in form so as to create a digital image of a second array of pixels, identifying pixels in the second array which form generally straight lines of connected pixels, calculating the offset of the lines in the second array from the lines in the first array, locating the data masks created in the first array into the second array by use of the calculated offset, and extracting data corresponding to character pixels from the data masks in the second array.

9 Claims, 7 Drawing Sheets

PHASE I

PHASE II

COPY MASKS

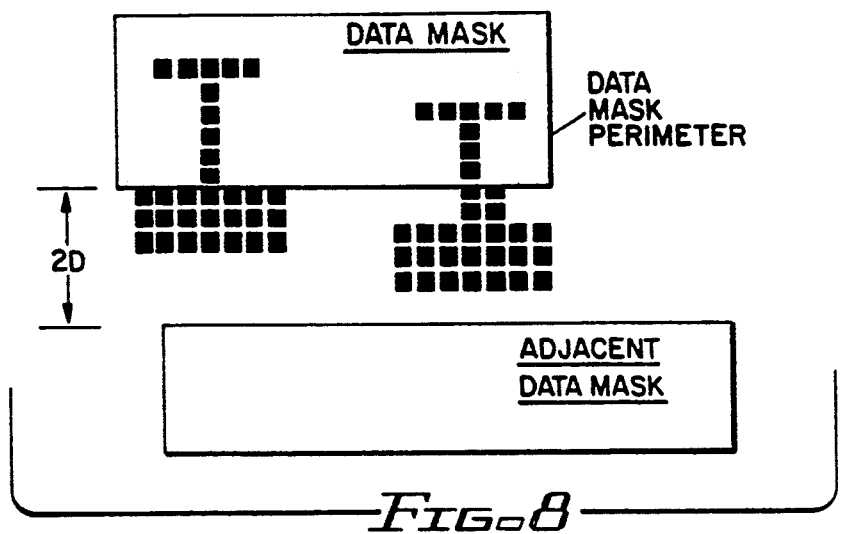
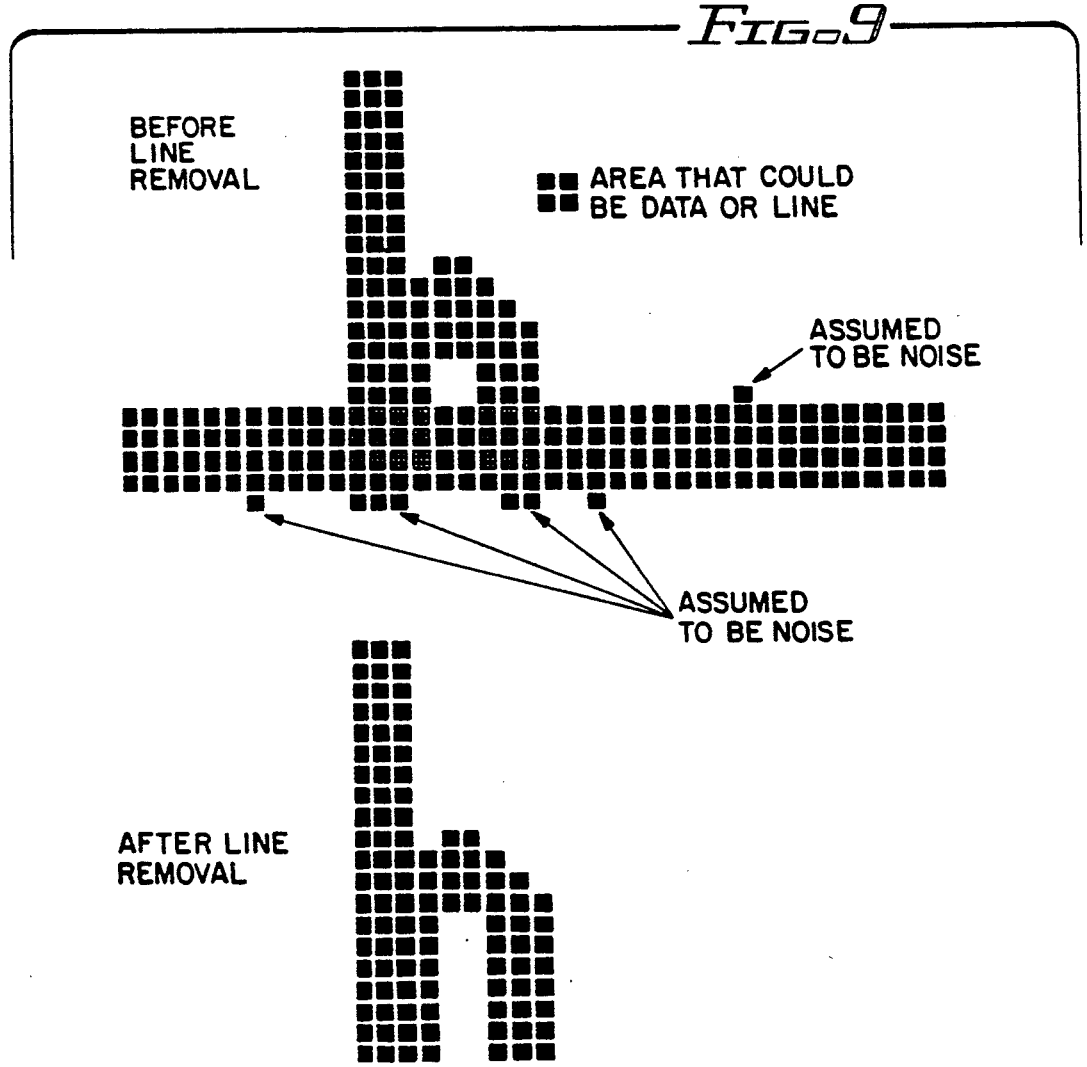

FIG. 12

| | STATE FILE NUMBER | | | |
|---|---|---|---|---|
| | 1A. NAME OF CHILD- FIRST (GIVEN) | | 1B. MIDDLE | |
| THIS CHILD | 2. SEX | 3A. THIS BIRTH, SINGLE, TWIN, ETC. | 3B. IF MULTIPLE, THIS CHILD IS 1ST, 2ND, ETC. | |
| PLACE OF BIRTH | 5A. PLACE OF BIRTH- NAME OF HOSPITAL OR FACILITY | | | |
| | 5C. CITY | | | |
| FATHER OF CHILD | 6A. NAME OF FATHER- FIRST (GIVEN) | | 6B. MIDDLE | |
| MOTHER OF CHILD | 9A. NAME OF MOTHER- FIRST (GIVEN) | | 9B. MIDDLE | |

CERTIFICAT[E]
STATE O[F]
USE BL[ACK]

104-

104—

| | STATE BIRTH CERTIFICATE NUMBER | | |
|---|---|---|---|
| THIS CHILD | 1A. NAME OF CHILD— FIRST<br>Smithersoniz | | 1B. MIDDLE<br>Wena |
| | 2. SEX<br>Male | 3A. THIS BIRTH, SINGLE, TWIN, ETC.<br>Twin | 3B. IF MULTIPLE, THIS CHILD 1ST, 2ND, ETC.<br>2nd |
| PLACE OF BIRTH | 5A. PLACE OF BIRTH- NAME OF HOSPITAL OR FACILITY<br>Mercy San Juan | | |
| | 5C. CITY OR TOWN<br>Carmichael | | |
| FATHER OF CHILD | 6A. NAME OF FATHER- FIRST<br>Winston | | 6B. MIDDLE<br>C |
| MOTHER OF | 9A. NAME OF MOTHER- FIRST<br>Lucille | | 9B. MIDDLE<br>Lorie |

FIG. 13

COMPUTER-IMPLEMENTED METHOD FOR AUTOMATIC EXTRACTION OF DATA FROM PRINTED FORMS

TECHNICAL FIELD

This invention relates to optical character recognition (OCR) devices and processes, and more particularly to a computer-implemented method for automatic extraction of data from printed forms.

BACKGROUND OF THE INVENTION

Automatic computer-implemented reading of data from printed forms is typically done in a sequence of three steps. First a form is optically scanned to create an electronic image, which is then written in digital storage as a rectangular array of 0's and 1's representing white and black subareas or pixels. Then the image is processed to extract regions or fields containing the data to be read. Finally, the black and white subimage in each extracted region is interpreted and expressed as an alphanumeric code, such as ASCII or EBCDIC.

The data present in printed forms may be defined as having two aspects: a value and a significance. For example, the word "Yes" is a value that becomes data only when its significance, i.e., the question it answers, is made clear. Printed forms provide a conventional means for recording data in which significance is predefined as a background of text and graphics, such as boxed areas. Since forms are printed mechanically, the background is identical over different instances of the same form. Thus the position of data values on the form is in correspondence with the data significance. Optical character recognition (OCR) devices take advantage of this fact to read data from credit card receipts, billing statements, etc. Such "OCR forms" are designed with data values entered in spaces well separated from background printing to assure that the latter are not erroneously interpreted as data values. Data significance does not appear explicitly, but is stored in the computer and associated with the data values on the basis of position in the image. In some cases, forms are printed in a color invisible to the scanner to avoid a possibility of confusion. Data values are carefully positioned during printing, and the form precisely registered during scanning. All these steps serve to guarantee that the data values are exactly where the reading or scanning equipment performs its extraction process.

In recent years, demand has grown for a capability to capture data from printed forms that do not meet OCR constraints. Forms routinely used in government and commercial operations, such as birth and marriage certificates, are designed to be intelligible to the human eye and brain. While people are sophisticated processors of visual images, they also require that both attributes of a data element, the significance and the value, be present on the document. Thus background printing is provided to supply the meaning of each data field, and lines and boxes are imposed to make clear the association of data value and data significance. The crowded appearance of these "people forms", compared with OCR forms, is a necessary outcome of a requirement to pack a great deal of information into a limited space.

It is likewise difficult to enforce controls in the preparation of people forms. A birth or marriage certificate filled out with a typewriter is registered by eye, often with errors in translation and skew compared to the ideal orientation. Data values may superimpose on the form background as a result. The printing process itself is subject to mechanical slippage that may give the same effect. Finally, mechanical slippage and electronic noise occurring during the optical scanning process present a further source of registration error. This is particularly true if economical general-purpose scanners are used. The net result of all these factors is that printing of a given data value on people forms may be skewed, may overlap boundary lines separating data regions, and even when ideally positioned does not consistently appear in a fixed, predictable region in scanned images of different instances of the form. These difficulties pose severe problems for automatic computer-implemented data extraction, rendering inapplicable the sort of processing used for OCR forms.

SUMMARY OF THE INVENTION

The invention is a computer-implemented method operable with conventional OCR scanning equipment and software for the automatic extraction of data from printed forms.

A blank master form is scanned and its digital image stored. Clusters of ON bits of the master form image are first recognized as part of a line and then connected to form lines. All of the lines in the master form image are then identified by row and column start position and column end position, thereby creating a master-form-description. The resulting image, which consists only of lines in the master form, can then be displayed. Regions or masks in the displayed image of master form lines are then created, each mask corresponding to a field where data would be located in a filled-in form. Each data mask is spaced from nearby lines by a predetermined data margin, referred to as D.

A filled-in or data form is then scanned and lines are also recognized and identified in a similar manner to create a data-form-description. The data-form-description is compared with the master-form-description by computing the horizontal and vertical offsets and skew of the two forms relative to one another. The created data masks, whose orientation with respect to the master form has been previously determined, are then transposed into the data form image using the computed values of horizontal and vertical offsets and skew. In this manner, the data masks are correctly located on the data form so that the actual data values in the data form reside within the corresponding data masks. Routines are then implemented for detecting extraneous data intruding into the data masks and for growing the masks, i.e. enlarging the masks to capture data which may extend beyond the perimeter of the masks. Thus, the data masks are adaptive in that they are grown if data does not lie entirely within the perimeter of the masks. During the mask growth routine, lines which are part of the background form are detected and removed by line removal algorithms.

Following the removal of extraneous data from the masks, the growth of the masks to capture data, and any subsequent line removal, the remaining data from the masks is extracted and transferred to a new file. The new file then contains only data comprising characters of the data values in the desired regions, which can then be operated on by conventional OCR software to identify the specific character values.

For a fuller understanding of the nature and advantages of the present invention reference should be made to the following detailed description taken in conjunction with the accompanying drawings.

BRIEF DESCRIPTION OF THE DRAWINGS

FIG. 8 is a graphical illustration of the Grow Bottom function for growing a data mask to capture data which crosses a mask perimeter;

FIG. 9 is a graphical depiction of a line removal process to capture character data which is intersected by a line, the line having been detected during the Grow Bottom function;

FIG. 12 is a typical bland birth certificate master form; and

FIG. 13 is a typical filled-in birth certificate data form.

DESCRIPTION OF THE PREFERRED EMBODIMENTS

Figure 1:
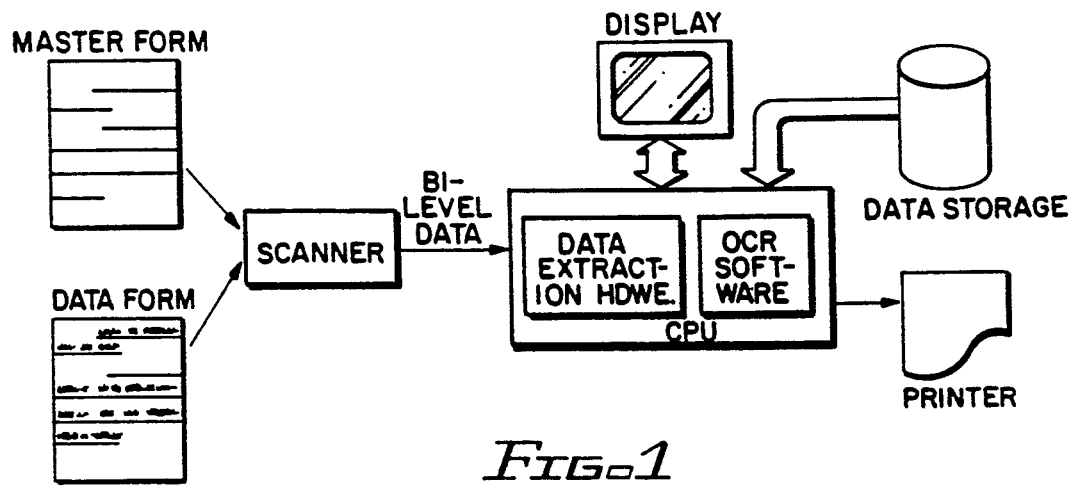
FIG. 1 is a schematic illustrating the relationship of the invention to conventional hardware and software for scanning an image and converting the image to stored characters through the use of OCR software.

Referring first to FIG. 1, the conventional hardware and software for converting characters from a printed form into stored digital data comprises a scanner, such as any 300 pixel bi-level scanner, and a central processing unit (CPU). The CPU is connected to conventional peripheral devices such as a display, a data storage (e.g. a hard disk file) and a printer. The scanner converts the printed image from the form into bi-level digital data which is transferred to the CPU and converted into an array of 0's and 1's, representing white and black pixels on the scanned form. Conventional OCR software is then utilized to recognize characters from the array of digital data. The CPU then stores and/or displays the results of the OCR software operation to any of its peripheral devices. Thus, the output from operation of the OCR software is character data, represented for example in ASCII format, which can be easily manipulated by the CPU and stored or transmitted to peripheral devices.

As illustrated in FIG. 1, in the present invention a blank master form is first scanned, converted to bi-level data, received by the CPU and stored. An example of a master form is shown in FIG. 12. A completed or filled in form, is then scanned, converted to bi-level data and stored by the CPU in an array referred to as an "old-map". An example of a filled-in or data form is shown in FIG. 13. The present invention is the method of data extraction performed by the data extraction software which allows just the pixels in the data regions or fields to be extracted from the old-map so that this data can then be received and operated on by the OCR software in the conventional manner. The functions of the data extraction software will be described with reference to the schematics of FIGS. 2-5 and to the "pseudo-code" included in Appendix A, which is incorporated herein by reference. A list of definitions to assist in understanding the pseudo-code is listed in Appendix B and incorporated herein by reference.

Figure 2:
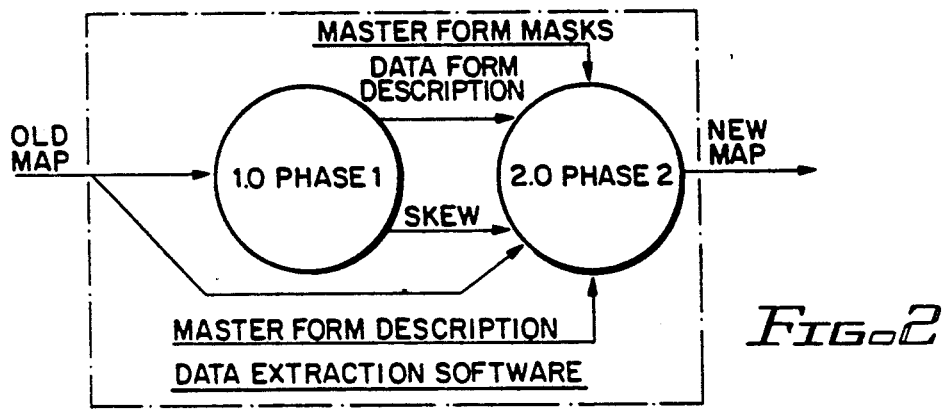
FIG. 2 is a schematic illustrating the two portions of the data extraction software designated Phase I and Phase II.

Referring now to FIG. 2, the data extraction software includes two phases, referred to as Phase I and Phase II. The operation of Phase I is identical for both the master form and the data form, while Phase II operates only on the data form. Thus, the first step in the data extraction process is the scanning of the blank master form and, through the use of the functions in Phase I to be described below, the creation of a master-form-description. The master-form-description includes the identification of all lines by location and length and the skew of the form, i.e. its angular orientation relative to a fixed coordinate system of the scanning device.

Figure 3:
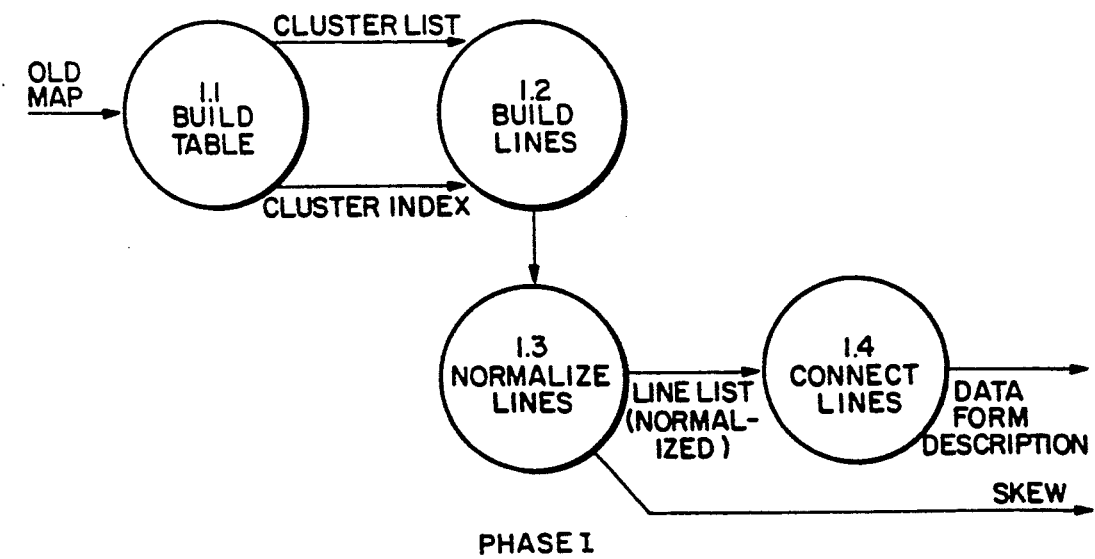
FIG. 3 is a schematic of the functions present in the Phase I portion of the data extraction software.

Referring to FIG. 3, the description of the operation of Phase I will be described relative to its operation on a scanned data form, i.e. the old-map, although as just indicated, the operation of Phase I is identical for the blank master form. This is because the function of Phase I is to locate all horizontal lines on the form, to generate a line-list and to identify the location and length of all of the lines on the form, be it the master form or the data form.

The old-map is a two-dimensional array of digital data corresponding to the pixels of the scanned data form image. Each pixel is either 1 or 0, or "ON" or "OFF", depending upon the presence or absence of either background lines or character data at the corresponding X-Y location. This digital data is analyzed with a Build Table routine (Appendix A, 1.1), which is a search for vertical runs of ON bits having a height less than an predetermined number, e.g. 3 in the preferred embodiment. The Build Table routine identifies all such vertical runs and creates a cluster-list for identifying the location of these vertical runs. The Build Table routine outputs a list of all vertical clusters located in the old-map and a cluster-index which points to the start of each row for each 3-pixel-high vertical cluster. This information is then passed to the Build Lines routine (Appendix A, 1.2) whose function is to connect horizontally related clusters to detect horizontal lines. Thus, the Build Lines routine searches through all clusters in the cluster-list, and with knowledge of their location from the cluster-index, identifies horizontal lines. If there is an additional cluster within a predetermined minimum length away from the portion of the line just built, then that cluster is added to the existing line. The output of the Build Lines routine is a line-list of all of the lines in the data form. Each line in the line-list is identified by its row-start, row-end, column-start, and column-end.

The lines are then normalized or de-skewed by the Normalize Lines (Appendix A, 1.3) routine. Because the data form may not have been perfectly aligned with the scanning device, or the background lines on the form not perfectly oriented on the form, the lines which have been identified from the Build Lines routine may be skewed. This means that the pixels comprising a line may not necessarily begin and end on the same row. The Normalize Lines routine calculates the average skew of the lines in the line-list. The skew is defined as the ratio of the difference between the start and stop row of a line to the difference between the start and stop column of the line. After the skew has been calculated in this manner, the lines are normalized or de-skewed so that each line in the line-list can now be identified by a row-start, column-start and column-end. As a necessary output of the Normalize Lines routine, the skew of the data form has been calculated and is available for later use. The Connect Lines routine (Appendix A, 1.4) then takes the list of Normalize Lines and determines if any of these lines are within a predetermined line tolerance of one another. If so, the lines are connected to make a single line, thereby reducing the number of lines in the line-list. As a result of the Connect Lines routine, the output is a data-form-description which is a listing of all horizontal lines in the data form, where each of those lines is identified by its row-start, its column-start and its column-end. A similar procedure may be performed to detect and identify vertical lines. Thus, at the completion of Phase I the data extraction software has generated in digital form an exact replica of all background lines present on the filled-in data form.

As previously described, the Phase I process is first performed on a master form, i.e. a form identical to a filled-in data form, but without any character data present in the data fields. This is the first step in the process in the present invention and results in a master-form-description which is a list of all horizontal lines on the master form identified by row-start, column-start, and column-end. Vertical lines would be identified by row-start, column-start, and row-end.

Referring now to Paragraph 1.5 of Appendix A, the next step is the creation of the data-field-masks from the master form, utilizing the master-form-description output by Phase I when the master form was scanned. The function of the Create Masks step is to define a series of rectangular masks separated by portions of the lines identified in the line-list of the master form, wherein each mask corresponds to a desired region where a data value is located in the data form. While there are numerous techniques for creating the masks, the preferred technique is to generate the output of Phase I from the master form on a visual display (See FIG. 1). A user, through the use of a light pen, then points to those regions bounded by lines where it is desired to extract data from the data forms. For example, the light pen could identify the upper left and the lower right corners of each desired data mask, which would result in identifying the location and dimensions of each rectangular data region. Each data mask has a perimeter which is preferably spaced from the lines by a predetermined data margin, D. As a result of the Create Mask step, the CPU will have stored the location and dimensions of the data regions by use of a mask-list, which identifies each mask by row-start, column-start and row-end, column-end. Since the normalized lines in the master form are presented on the visual display during this step it is not necessary to compensate for skew when the data masks are created on the master form.

At this point in the description of the invention, a master form has been scanned, a master-form-description has been defined through the use of Phase I (FIG. 3 and Appendix A, 1.1-1.4), the data masks have been created, a data form has been scanned and a data-form-description has been generated through the use of Phase I.

Figure 4:
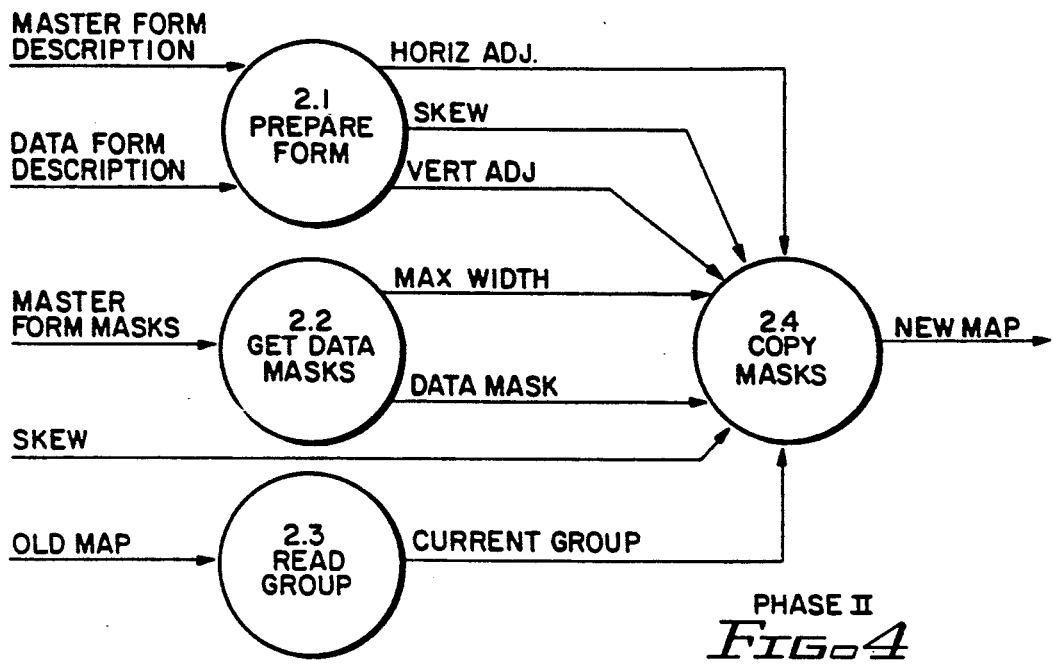
FIG. 4 is a schematic of the functions present in the Phase II portion of the data extraction software.

Phase II is now performed on the data form. Referring now to FIG. 4 and Paragraph 2 of Appendix A, it is noted that Phase II has several functions. The first function is the Prepare Form routine (Appendix A, 2.1) which compares the data-form-description with the master-form-description in order to calculate the differences in terms of field locations between the two descriptions. The function of the Prepare Form routine can be better understood by reference to FIG. 6. Because the data form cannot always be perfectly aligned with the scanner, there will usually be both vertical and horizontal offsets of the data form lines from the master form lines form each time a new data form is scanned. Thus, the Prepare Form routine compares each line in the line-list in the master-form-description with its corresponding line in the line-list in the data-form-description, and using the differences between the row-start, column-start and column-end values, determines the offset of the data form from the master form. This offset is essentially the horizontal adjustment (horiz-adj) and the vertical adjustment (vert-adj) necessary to transform the master form into the data form. The output of the Prepare Form routine are the values or horiz-adj, vert-adj, and skew, the latter term being the rotation of the data form relative to the master form (See FIG. 6).

In the Get Data Masks function (FIG. 4 and Appendix A, 2.2), the data masks created from the master form and which are identified by location and dimension, are retrieved and placed in corresponding locations on the data form so as to create data masks located in the data form. As part of the Get Data Masks function, the width of the output array is calculated as the width of the longest data mask created from the master form plus a constant (such as two bytes). This number becomes the width of the output image containing the extracted data.

The next function in Phase II is the Read Group function (Appendix A, 2.3), which transfers the old-map image from data storage into main memory, creating an array of records, referred to as "current-group", where each record has a width corresponding to the width of the scanned image. Thus, the Read Group function essentially converts the bi-level raw data into an array having a width and height corresponding to that of the scanned image. The output of the Read Group function is the current-group.

Figure 5:
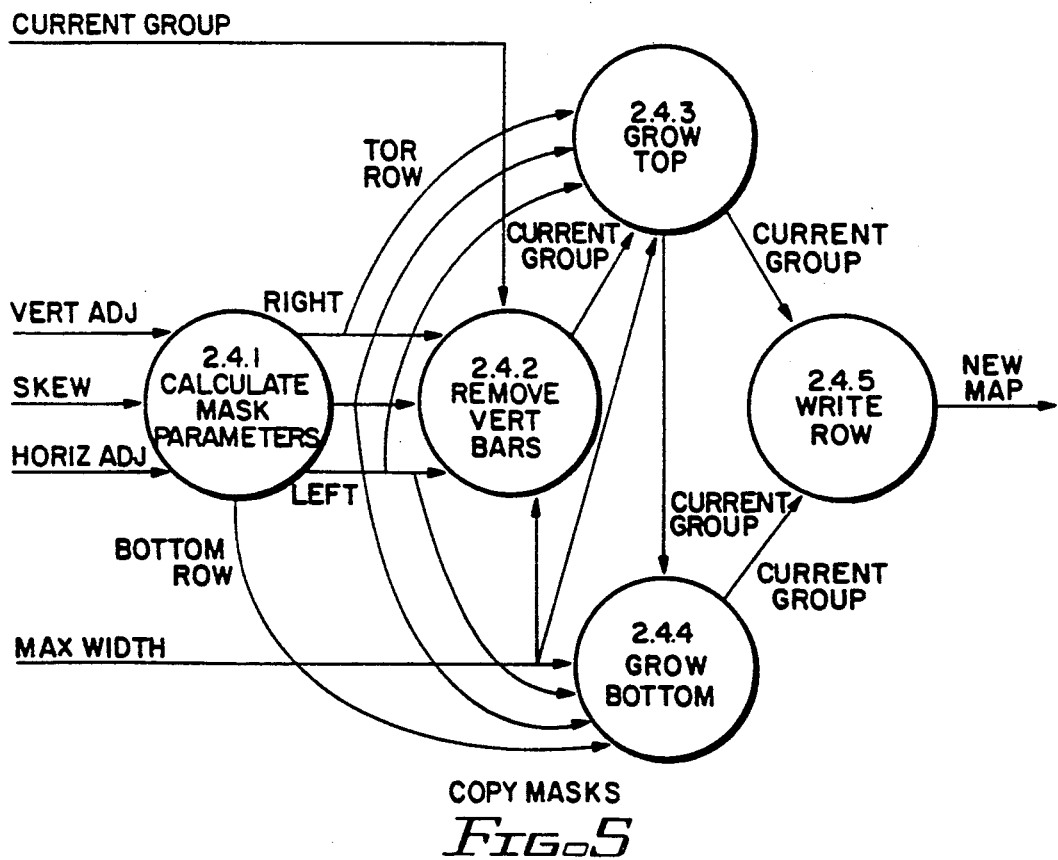
FIG. 5 is a schematic of the Copy Masks function of the Phase II portion of the data extraction software.
Figure 6:
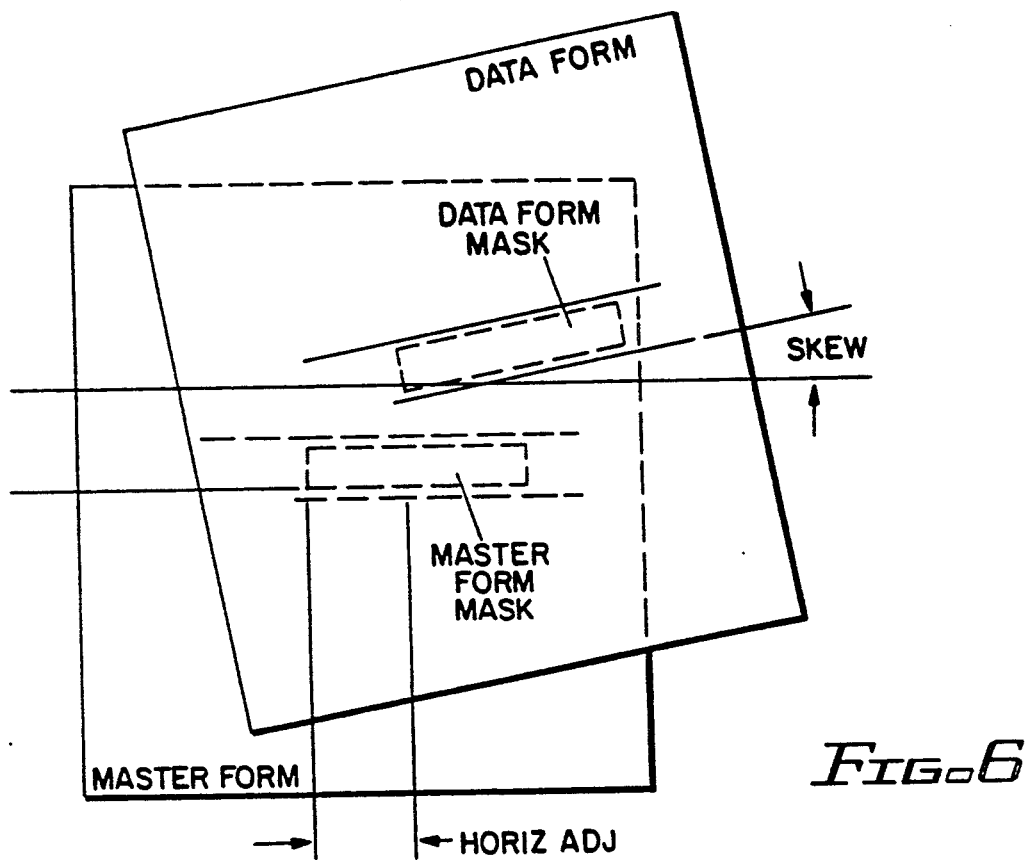
FIG. 6 is an illustration of the manner in which horizontal and vertical adjustments between the master form and the data form are used to register the data form following scanning.
Figure 7:
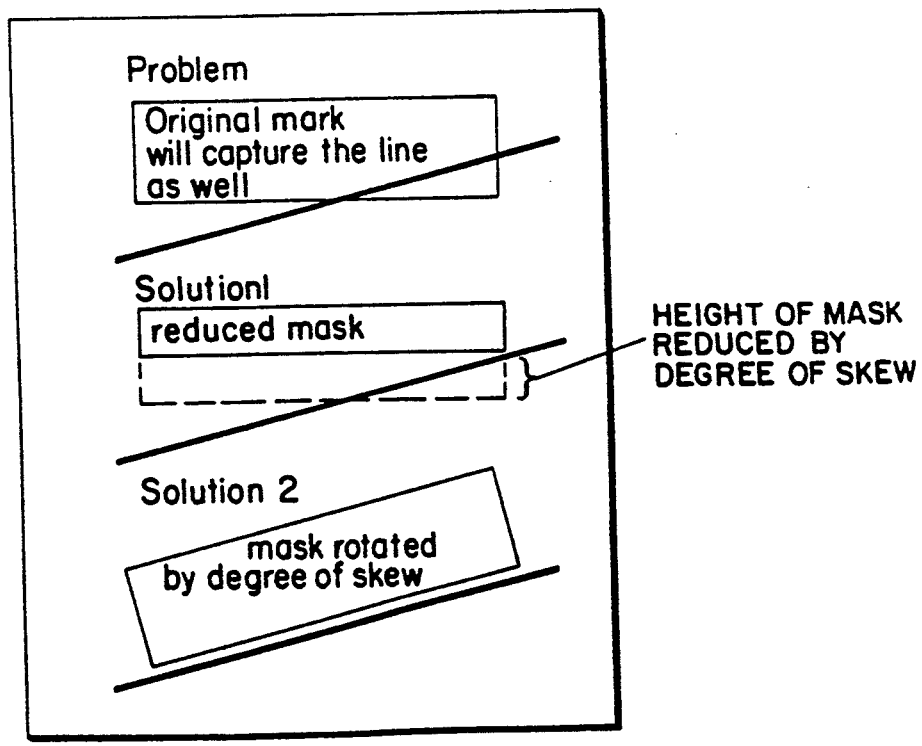
FIG. 7 is a depiction of an alternative solution to the problem of skew in the location of a data mask.

The Copy Masks function of Phase II comprises the five routines shown in FIG. 5. The Copy Masks function locates the data masks in a current-group to be extracted, grows or enlarges the masks, if necessary, to capture information which lies outside of the masks, removes any lines which intrude into the data masks, and finally writes the extracted data to the extracted image. As part of the Copy Masks function, the mask parameters are calculated in the Calculate Mask Parameters routine. This process essentially adjusts the data masks to compensate for skew, horizontal offset and vertical offset relative to the master form. The operation of the Calculate Mask Parameters can best illustrated by reference to FIG. 6. The input to the routine are the data mask locations and dimension, and vert-adj, horiz-adj and skew which have been previously calculated in the Prepare Form function. FIG. 6 illustrates how each of these parameters is used to transpose the location of the data masks, whose relationships relative to the master form are known, to their correct locations on the data form. As shown in FIG. 6, the skew rotates the masks by the degree of the skew. However, while this may be an optimal solution in that the size of the masks remain the same as in the master form, the CPU cost in performing the rotation step and in growing the masks may be inefficient if the skew remains within a reasonable range. In an alternative technique, as shown in FIG. 7, the skew is used to alter the height of the mask in the data form, so that the resulting mask in the data form retains its rectangular shape. As the skew increases, the chance of the predefined rectangle not fitting inside the field increases. To compensate for this, as the skew becomes greater the heights of the masks are reduced. The output of the Calculate Mask Parameters routine is the location and dimension of the data masks within the data form, each data mask being defined by its start or left column, its end or right column, and its top-row and bottom-row.

After the Calculate Masks Parameters routine has been performed, if the data is perfectly located within the masks, then no additional data extraction routines are needed and the data can be extracted directly by the Write Row routine (Appendix A, 2.4.5). Perfect data is considered to be data that resides entirely within a predefined data mask. If there are no ON pixels along the parameter of the mask, the data is considered to be wholly inside the mask and completely perfect. In the Write Row function, all of the data in the current-group which is contained in the rectangles defined by left, right, top-row and bottom-row, i.e. all of the data in the masks, is copied to a new file. The result is that the new file contains only extracted data without any extraneous lines of the background form. The data located in the new file can then be operated on by conventional OCR software to identify the data as specific character data. In addition, because each data mask is predefined as corresponding to a certain significance, i.e. name, age, etc., the data which has been extracted from the form and converted to character data by the OCR software is immediately identifiable with a predetermined significance.

If, on the other hand, the data present in the data masks is not perfectly located within the perimeter of the data masks, then it is necessary to perform one of the additional functions of the Copy Masks function (FIG. 5).

The Remove Vert Bars (Appendix A, 2.4.2) removes vertically oriented bars which may be intruding into a data field, such as the portion of the signature in the "Middle" data field shown in FIG. 13. The Remove Vert Bars routine checks the two right-most and left-most bytes for the entire height of each field to determine if there is a run of connected ON bits that occurs that forms a vertical line. If such a line is not included since it assumed that data occurring beyond the vertical bar belongs to another field.

Figure 10:
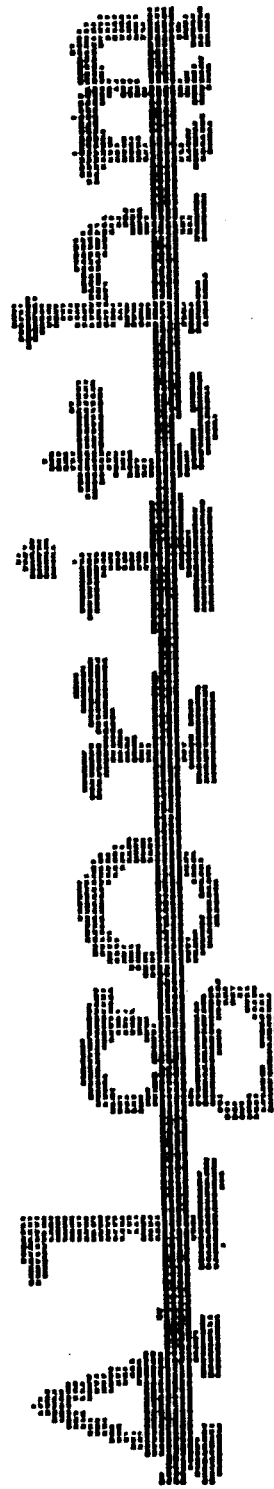
FIG. 10 is a representation of ON pixels for data intersected by a line.
Figure 11:
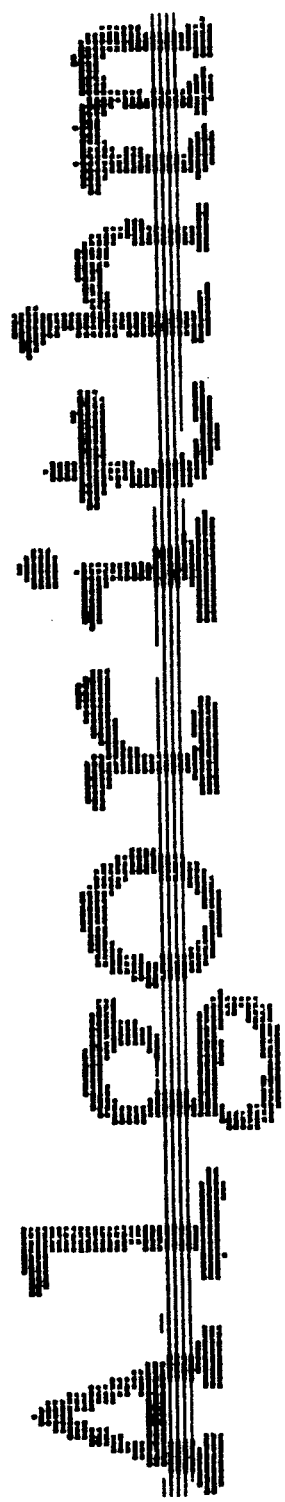
FIG. 11 is a representation of the ON pixels depicted as dashes following detection of the line pixels through the use of the algorithm in Appendix C.

Referring now to FIG. 8, the Grow Bottom routine (Appendix A, 2.4.4) enlarges the bottom of the mask until all of the data in the field has been captured or until the growth of the mask reaches a predetermined limit, defined as 2D, the spacing between neighboring data masks. The mask is grown and during the growth lines are detected in the manner similar to the line detection technique described in Phase I. The mask is grown by searching a perimeter row for ON bits. If a violation (the presence of ON bits) is encountered, the column to the left and right of the violation on the next row (one row up if growing the top of the mask, one row down if growing the bottom of the mask) is checked for ON bits. If either column has ON bits, then the process is repeated. This process terminates if either both bytes become OFF, or the maximum growth limit of 2D is reached. Once any portion of a line is detected during mask growth the complete line is removed. A similar technique is used in the Grow Top (Appendix A, 2.4.3) to enlarge the bottom of the mask to capture data. For example, the word "Twin" in FIG. 13 would be located entirely within the grown data mask and the line removed. The line removal process is activated whenever the Grow Top or Grow Bottom routine detects a line in the ambiguous 2D area (FIG. 8). Line removal begins by following the path of the line and erasing the line as it is followed. The erasing of the line also erases anything that lies either one pixel above or one pixel below the line. This is to account for edge noise that is generated during printing and scanning. As the line is being erased, a check is made to determine whether there is any data that may be either touching or going through the line. If such data is found, the areas where the pixels may be from the line or from the data are not erased (see FIG. 9). The line detection and erasing algorithm has also been implemented in APL and is listed in Appendix C together with descriptions of the respective lines and routines. FIGS. 10 and 11 illustrate a pattern processed by the algorithm of Appendix C wherein FIG. 10 is the input pattern where all black or ON pixels are denoted with an asterisk, and FIG. 11 is the result of the line detection algorithm wherein the lines have been detected and the asterisks replaced with dashes.

While the preferred embodiments of the present invention have been illustrated in detail, it should be apparent that modifications and adaptations to those embodiments may occur to one skilled in the art without departing from the scope of the present invention as set forth in the following claims.

APPENDIX A 1.0 Phase I

Phase I is responsible for building a description of the old-map (incoming image) that can be compared to a master form.

1.1 Build Table

1.1.1 Description

This process searches through the first 500 rows of the old-map, looking for vertical runs that are less than 3 bits high. A table called cluster-list is built that lists all of these vertical runs.

1.1.2 Inputs old-map

1.1.3 Process

```
while entire block not read
   for each byte in a row
      if byte > 0
         increment cluster-size-counter
   else
      if cluster-size-counter << 3
         add cluster to cluster-list
   read next row
      sort cluster-list
         index cluster-list to create cluster-index
```

1.1.4 Outputs cluster-list, cluster-index 1.2 Build Lines

1.2.1 Description

This process converts cluster-list to line-list by connecting horizontally related clusters.

1.2.2 Inputs cluster-list, cluster-index 1.2.3 Process

```
for each cluster-list-item
   while cluster-list-items connected
      search for the next connected cluster-list-item
      if the next cluster-list-item is less than
min-length away
        add cluster-list-item to line list
   else
        cluster-list-items no longer connected
```

1.2.4 Outputs line-list 1.3 Normalize Lines 1.3.1 Description

The process converts line-list from a (row-start, row-end, column-start, column-end) orientation to a (row, column-start, column-end) orientation 1.3.2 Inputs line-list

1.3.3 Process calculate the average row-start - row-end variation (row-deviation)

calculate the average col-start - col-end variation (col-deviation)

if col-deviation >0 skew = row-deviation / col-deviation for each line-list-item line-list-item[row-start] = line-list-item[row-start] - skew*line-list-item[col-start],

1.3.4 Outputs line-list (normalized),skew

1.4 Connect Lines

1.4.1 Description

All lines that are within a line-tolerance distance of each other are connected to become one line. These lines then become the data-form-description

1.4.2 line-list (normalized)

1.4.3 Process for each line if the line-list-item is within line-toler of another line make the two line-list-items a single line-list-item move the line-list-item to data-form-description

1.4.4 Outputs data-form-description

1.5 Create Masks (only for master form)

2.0 Phase II

Phase II is responsible for locating each data field (mask) on the data form, extracting character data from the masks and placing it in a new file. Phase II also removes any lines that may be interfering with the data field.

2.1 Prepare Form

2.1.1 Description

Prepare Form compares the data-form-description to the master-form-description and calculates the offset in terms of field locations between the two descriptions.

2.1.2 Output master-form-description, data-form-description

2.1.3 Process for each data-form-description item
    horiz-adj = horiz-adj +
master-form-description[col-start] -

```
            data-form-description[col-start] +
            master-form-description[col-end] -
            data-form-description[col-end]
vert-adj = vert-adj + master-form-description[row] -
            data-form-description[row]
```

2.1.4 Outputs horiz-adj, skew, vert-adj

2.2 Get Data Masks

2.2.1 Description

Get Data Masks gets the master-form-masks and places them in the data form and also records the maximum allowable width of a mask.

2.2.2 Inputs master-form-masks

2.2.3 Process

Place all master-form-masks in data-mask
max-width = max length (data-mask item)

2.2.4 Outputs max-width, data-masks

2.3 Read Group 2.3.1 Description

This process converts the image into current-group (an array of records, each map-width in size)

2.3.2 Inputs old-map 2.3.3 Process while not eof old-map
    place map-width bytes in current-group-item 2.3.4 Outputs current-group 2.4 Copy Masks Description This process locates the mask in the current-group to be extracted, grows the mask, if necessary, to capture information that lies outside of the original mask, removes any intruding lines, and writes the extracted to extracted-image Inputs horiz-adj, skew, vert-adj, max-width, data-mask, current-group, skew Process for each data-mask item
    Calculate Mask Parameters
    Remove Vert Bars
    Grow Top
    Grow Bottom
    Write Row Outputs extracted-image

2.4.1 Calculate Mask Parameters

2.4.1.1 Description

This process adjusts the data mask to compensate for skew, horizontal offset, and vertical offset.

2.4.1.2 Inputs data-mask, vert-adj, skew, horiz-adj

2.4.1.3 Process

```
adj-row = skew * data-mask[col-start]
adj-col = skew * data-mask[row-start] / 200
top-row = min
(data-mask[row-start],data-mask[row-end]) +
adj-row + vert-adj
bottom-row = max
(data-mask[row-start],data-mask[row-end]) +
``` adj-row + vert-adj left = data-mask[col-start] + horiz-adj - adj-col right = data-mask[col-end] + horiz-adj - adj-col

2.4.1.4 Outputs left, right, top-row, bottom-row

2.4.2 Remove Vert Bars

2.4.2.1 Description

This process removes the vertical bars that may be passing through the data field.

2.4.2.2 Inputs left, right, top-row, bottom-row, max-width

2.4.2.3 Process

```
set found-bar to true
set current-column to left
while found bar true and (current-column <<
(left+8))
   calculate the number of columns with ON bytes
from top-row to bottom-row
   if the number of ON bytes > bar-size
      current-column = current-column+1
   else
      found-bar = false
set found-bar to true
set current-column to right
current-column = current-column - 1 while found
```

```
            bar true and (current-column << (right-8))
    calculate the number of columns with ON bytes
from top-row to bottom-row
    if the number of ON bytes > bar-size
        current-column = current-column-1
    else
        found-bar = false
right = current-column
```

2.4.2.4 Outputs current-group (with the vertical bars for the field removed)

2.4.3 Grow Top

2.4.3.1 Description

This process will grow the top of the mask until all of the data in the field has been captured or the growth of the mask reaches the 2D limit.

2.4.3.2 Inputs left, right, top-row, max-width, current-group

2.4.3.3 Process

```
found = true
displace = top-row - cur-top + 1
if (top-row << 2D)
    growth = top-row - 1
else
    growth = 2D
```

```
while found and (i << growth)
   i = i + 1
   start-left = left for each column from left to right
   if (current-group[displace-i][column] is ON)
      tot-line = tot-line + 4;
   else
      if tot-line > (line-length*4)
         for each column from start-left to (i-1)
            current-group[displace-i+1][column] =
                  current-group[displace-i+2][column]
            current-group[displace-i][column] =
                  current-group[displace-i+1][column]
            current-group[displace-i-1][column] =
                  current-group[displace-i-2][column]
         start-left = i
         tot-line = 0 if tot-line > 0
   for each column from start-left to right
   current-group[displace-i][column] =
            current-group[displace-i+1][column]

if current-group[displace-i+1] has any ON bits
near
      current-group[displace-i] ON bits
   found = true
else
   found = false 2.4.3.4 Outputs
``` current-group (with the top portion of the
adaptive mask adjusted for the field adjusted)

2.4.4 Grow Bottom

2.4.4.1 Description

This process will grow the bottom of the mask
until all of the data in the field has been
captured or the growth of the mask reaches the 2D
limit.

2.4.4.2 Inputs left, right, bottom-row, max-width

2.4.4.3 Process

```
found = true
displace = bottom-row - cur-top + 1
if (max-grow+bottom-row << vert-max)
   growth = vert-max-bottom-row - 1
else
growth = 2D while found and (i << growth)
   i = i + 1
   start-left = left
   for each column from left to right
      if (current-group[displace+i][column] is ON)
         tot-line = tot-line + 4;
      else
         if tot-line > (line-length*4)
```

```
            for each column from start-left to (i-1)
                current-group[displace+i-1][column] =
                    current-group[displace+i-2][column]
                current-group[displace+i][column] =
                    current-group[displace+i-1][column]
                current-group[displace+i+1][column] =
                    current-group[displace+i+2][column]
        start-left = i
        tot-line = 0 if tot-line > 0
        for each column from start-left to right
            current-group[displace-i][column] =
current-group[displace-i+1][column]

if current-group[displace+i-1] has any ON bits
near current-group[displace+i] ON bits
        found = true
    else
        found = false
```

2.4.4.4 Outputs current-group (with the bottom portion of the adaptive mask adjusted for the field adjusted)

2.4.5 Write Row 2.4.5.1 Description

This process will copy the extracted data to extracted image 2.4.5.2 Inputs left, right, top-row, bottom-row, current-group 2.4.5.3 Process copy all data in current-group contained in the rectangle defined by left, right, top-row, bottom-row 2.4.5.4 Outputs extracted-image

APPENDIX B

Process I cluster-index : index of cluster-list that points to the start of each row, array of integer cluster-list : list of vertical clusters located in old-map array of (col, row-start, row-end), integers data-form-description: normalized list of lines located in old-map file of (row, col-start, col-end), integers line-list : list of horizontal lines located in old-map array of (row-start, row-end, col-start, col-end), integers old-map : bi-level uncompressed scanned image of a form, file of bytes same-line : maximum vertical variation between lines in order for them to be considered on same row skew : angle of lines located in data form, floating point Process II bottom-row : the last row of the perfect data for a data-mask to be extracted from current-group, integers current-group : The formatted array from old-map array [height of image] [width of image], bytes data-form-description : normalized list of lines located in old-map file of (row, col-start, col-end), integers data-mask : master-form-mask extracted-image : The fields extracted from old-map file of [max-width], bytes horiz-adj : difference between the horizontal location of lines in the data-form-description and the master-form-description, integer left : the column to begin extracting the current data-mask from current-group, integer master-form-description : normalized list of lines located in the master form file of (row, col-start, col-end), integers master-form-masks : list of mask locations to be extracted from the data-form array of (row-start, row-end, col-start, col-end), integers max-width : the length of the longest mask, integer old-map : bi-level uncompressed scanned image of a form, file of bytes right : the column to end extracting of the current master-form-mask from current-group, integers skew : angle of lines located in data form, floating point top-row : the first row of the perfect data for a master-form-mask to be extracted from current-group, integers vert-adj : difference between the vertical location of lines in the data-form-description and the master-form-description, integers

APPENDIX C

```
      ∇ Z←LTH TRACKTHRU X;S;R;RUN;RUN1;RUN2;EDGE;BCARRY;TCARRY;B;T
[1]   ᴀ
[2]   S←(S[3;]>LTH)/S←STRINGS2D X
[3]   RUN←(ρX) UNSTRING2D S
[4]   RUN1←(1 0 SHFT RUN)∨(⁻1 0 SHFT RUN)
[5]   RUN2←(~RUN1)∧R←(1 0 SHFT RUN1)∨(⁻1 0 SHFT RUN1)
[6]   RUN1←(~RUN)∧RUN1
[7]   EDGE←THICK(RUN2∧X)
[8]   TCARRY←RUN1∧X∧(1 0 SHFT EDGE)
[9]   Z←TCARRYvBCARRY←RUN1∧X∧(⁻1 0 SHFT EDGE)
[10]  BR&CL.T←+/+/TCARRY
[11]  B←+/+/BCARRY
[12]  TCARRY←(TCARRYv(1 0 SHFT TCARRY))∧(X∧RUNvRUN1)
[13]  BCARRY←(BCARRYv(⁻1 0 SHFT BCARRY))∧(X∧RUNvRUN1)
[14]  →BR×₁(T<+/+/TCARRY)v(B<+/+/BCARRY)
[15]  Z←Zv(~RUN1vRUN)∧X
[16]  Z←Zv(TCARRY∧THICK BCARRY)v(BCARRY∧THICK TCARRY)
      ∇
```

Notes

In this routine the input arguments are X, the input bitmap, and LTH, a parameter that is larger than the width of any character pattern. Thus a horizontal string of black pixels having length greater than LTH can be assumed to belong to a horizontal line.

TRACKTHRU first creates a subpattern of X containing all black pixels within 1 pixel of a long run. Black pixels outside this subpattern are assumed to belong to the pattern to be preserved. Black pixels inside the subpattern are assumed to belong to the character if they are within the upward and downward "shadow" of known character pixels. The shadow consists of pixels that belong to vertical black runs terminating on character pixels. To accommodate slanting of character parts that pass through the line, the algorithm also includes as character pixels those that are in only one shadow, but adjacent to the other.

Line 2. STRINGS2D is a function that returns the starting (row, column) and length of each horizontal black run in X. After execution of this statement array S contains these values for all runs having length greater than LTH.

Line 3. Unstring2D creates bit map RUN containing the long runs described in S. RUN is called the "long run image."

Line 4. RUN1 is a thickened version of RUN obtained by shifting up and down by 1 pixel and ORing the two shifted bitmaps.

Line 5. RUN2 is a bitmap that is black at a distance of 2 pixels from the long run image.

Line 6. RUN1 is a bitmap that is black at a distance of 1 pixel from the long run image.

Line 7. THICK is a function that adds 1 pixel of thickness to the upper and lower edges of an input pattern. Thus EDGE is black at pixels that either belong to or are vertically adjacent to black pixels of X that are at distance 2 from the long run image.

Line 8. TCARRY is black at pixels of X that are distance 1 above the long run image and that are directly beneath black pixels at distance 2.

Line 9. BCARRY is defined similarly to TCARRY, but for pixels below the long run image. Output Z is initially assigned the union of TCARRY and BCARRY.

Line 10-14. (Repetitive loop) In this loop all black pixels at distance 1 or less from the long run image, and which lie directly beneath black pixels in TCARRY, are ORed into TCARRY. The same is done for BCARRY, which accumulates black pixels above it.

Line 15. Pixels of X that are within distance 1 or less from the long run image are ORed to the output Z.

Line 16. Pixels that are black in either TCARRY or BCARRY, and are within 1 pixel of the intersection of these two subpatterns of X, are ORed to the output.

What is claimed is:

1. A machine-implemented method for extracting character data from printed forms of the type having generally straight lines and data regions separated by the lines, the method utilizing a processor coupled to an image scanning device and a storage means, the method comprising the steps of:
    (a) scanning a blank form so as to create a digital image of a first array of pixels representing the blank form;
    (b) identifying line pixels in the first array which form generally straight lines of connected pixels;
    (c) creating data masks in the first array at locations separated by the line pixels, the data masks corresponding to data regions in the blank form;
    (d) scanning a filled-in form so as to create a digital image of a second array of pixels representing the filled-in form;
    (e) identifying line pixels in the second array which form generally straight lines of connected line pixels;
    (f) using line pixels in the second array and line pixels in the first array, calculating an offset of lines in the second array from lines in the first array;
    (g) applying the data masks created in the first array to the second array by use of the calculated offset;
    (h) determining if any connected character pixels extend across the perimeter of a data mask;
    (i) in response to said determination, enlarging the data mask until substantially all connected character pixels are located within the enlarged data mask; and
    (j) extracting data corresponding to character pixels from the data masks in the second array.

2. The method according to claim 1 wherein the step of enlarging the data mask comprises enlarging the mask only in a region of the mask perimeter crossed by the connected character pixels.

3. The method according to claim 1 wherein the step of enlarging the data mask further comprises the steps of:
    detecting if any connected character pixels extend across a line; and
    selectively removing line pixels corresponding to the line which are not located in a portion of the line crossed by the connected character pixels.

4. The method according to claim 1 wherein the step of identifying pixels which form generally straight lines of connected pixels comprises the steps of:
    selecting clusters of vertically-connected pixels, the clusters having a vertical height less than a predetermined number of pixels; and
    connecting horizontally adjacent clusters.

5. The method according to claim 1 wherein the step of identifying pixels which form generally straight lines of connected pixels comprises the step of determining the rotational skew of the connected line pixels.

6. The method according to claim 1 wherein the method also utilizes a display coupled to the processor and wherein the step of creating data masks comprises the steps of:
    displaying the identified lines on the display; and
    storing in the data storage means the array locations of data masks selected by a user in response to the displayed lines.

7. The method according to claim 1 wherein the step of calculating an offset further comprises the steps of:
    calculating the horizontal adjustment of the lines in the second array relative to the lines in the first array;

calculating the vertical adjustment of the lines in the second array relative to the lines in the first array; and calculating the rotational skew of the lines in the second array.

9. The method according to claim 7 wherein the step of locating the data masks in the second array comprises rotating the data masks by the degree of calculated skew.

9. The method according to claim 7 wherein the step of locating the data masks in the second array comprises adjusting the vertical height of the data masks by the degree of calculated skew.

* * * * *